Feb. 19, 1963 R. F. MEINECKE ETAL 3,078,026
MILK CONTAINERS
Filed Aug. 14, 1961 2 Sheets-Sheet 1

INVENTOR
ROBERT F. MEINECKE
FRANK W. LOCKE
BY Robert M. Dunning
ATTORNEY

Feb. 19, 1963   R. F. MEINECKE ETAL   3,078,026
MILK CONTAINERS

Filed Aug. 14, 1961   2 Sheets-Sheet 2

INVENTOR
ROBERT F. MEINECKE
FRANK W. LOCKE
BY
ATTORNEY

United States Patent Office 3,078,026
Patented Feb. 19, 1963

3,078,026
MILK CONTAINERS
Robert F. Meinecke, Stillwater, and Frank W. Locke, Minneapolis, Minn., assignors to Waldorf Paper Products Company, a corporation of Minnesota
Filed Aug. 14, 1961, Ser. No. 131,360
6 Claims. (Cl. 229—14)

This invention relates to an improvement in milk containers and deals particularly with a paperboard container designed to contain a plastic bag filled with a liquid such as milk and the like.

During recent years certain products such as milk have been sold in larger units. Due to the fact that milk deliveries to homes are made at less frequent intervals, the use of larger containers for containing the goods has been more commonplace. One of the difficulties has been in the fact that milk cans designed to contain several gallons of milk are expensive and must be sterilized after each use. Accordingly, the use of a disposable container for milk has been found desirable.

The present invention resides in the provision of a rectangular container which in preferred form includes a rectangular sleeve with a pair of inverted covers inserted in opposite ends of the sleeve and secured in place. Within the sleeve is provided a plastic bag which is filled with milk and sealed before one end of the container is secured in place. The bag is provided with an outlet hose through which the milk may be dispensed and which may normally be held closed by a clamp or other suitable means. This hose is normally stored within a small compartment at one end of the container. The compartment is provided with a potential flap formed by perforated lines or other weakened lines of separation. When the flap is opened, the tube may be withdrawn and extended through a notch at one end of the container. The milk can be dispensed through this tube.

A feature of the present invention resides in the provision of a container having an inverted cover closing one end of the sleeve, the cover having a panel extending from one end of its edges which folds inwardly of the cover to form a compartment of generally triangular cross section. This compartment is of proper size to accommodate the hose or tube through which the contents of the bag are drained.

A further feature of the present invention resides in the provision of a compartment which is normally sealed and which includes a potential flap which may be easily torn out to provide access to the tube. A portion of the flap which is removed is in registry with a notch in the side wall of the container so that the tube may extend through this notch when the container is standing on its end.

These and other objects and novel features of the present invention will be more clearly and fully set forth in the following specification and claims.

In the drawings forming a part of the specification:

Figure 1:
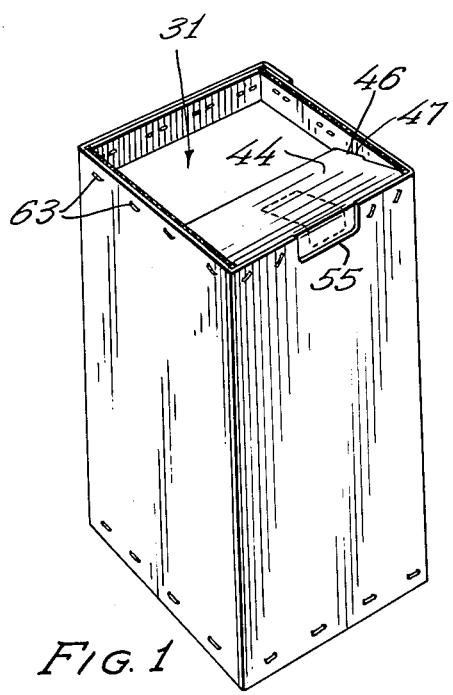
FIGURE 1 is a perspective view of the sealed container.

The container is extremely simple in form. In the form illustrated, it includes four rectangular panels 10, 11, 12, and 13 which are foldably connected together along parallel fold lines 14, 15, and 16. The stitch flap 17 is illustrated as being connected along an edge of the panel 10 along a fold line 19. In producing the container, the stitch flap 17 is placed in overlapping relation to the edge of the panel 13 and stitched or adhered in place.

One end of the sleeve formed by the blank described is closed by an end member 20 which comprises what is commonly known in the trade as an inverted cover. The end member 20 includes a rectangular panel 21 which is foldably connected along parallel fold lines 22 and 23 to flanges 24 and 25 respectively. The remaining parallel side edges of the panel 21 are connected along the parallel fold lines 26 and 27 to the flanges 29 and 30 respectively. The flanges 24, 25, 29 and 30 are all of the same width.

The other end of the container is closed by the end member 31 which, in general, is also what is known to the trade as an inverted cover, but in modified form. The end member 31 includes a bottom panel 32 which is foldably connected along parallel edges 33 and 34 to flanges 35 and 36 respectively. Preferably, the flanges 35 and 36 are somewhat tapered, being somewhat wider at the ends 37 thereof than at the opposite ends 39. A flange 40 is hingedly connected to one of the remaining edges of the panel 32 along a fold line 41. The flange 40 is of substantially equal height to the ends 37 of the flanges 35 and 36. The remaining edge of the rectangular bottom panel 32 is connected along a fold line 42 to a flange 43, the flange 43 being substantially equal in height to the end 39 of the flanges 35 and 36. As a result of this arrangement, the panel 32 which forms the bottom of the container while the product is being dispensed is slightly inclined so that all of the fluid may readily drain from the container.

A panel 44 is hingedly connected to the flange 43 along a fold line 45 which is parallel to the fold line 42. The side edges of the panel 44 are provided with slightly projecting tongues or ears 46. The flanges 35 and 36 are provided with slots 47 therein which extend angularly toward the corners of the flanges 35 and 36 at the ends 39 thereof.

The bottom panel 32 is provided with an opening 49 therethrough, the opening 49 being preferably midway between the fold lines 33 and 34 and adjacent the fold line 42. A potential removable flap 50 is provided in the flange 43 and panel 44. This flap is formed by a cut line 51 parallel to and spaced slightly from the fold line 42, and a pair of perforated lines 52 which extend from the cut line 51 across the fold line 45 to terminate short of the end edge 53 of the panel 44. A fold line 54 connects the ends of the cut lines 52 and is parallel to the end 53. A notch 55 is provided in one of the wall panels of the body blank, the notch 55 being shown midway between the fold lines 15 and 16 connecting the panel 12 to the panels 11 and 13, respectively.

A plastic bag 56 is designed to contain the product. While the specific form of construction is not evident, it is obvious that the bag 56 must be of proper dimensional size to fit snugly within the container. A flexible tube 57 is anchored to an end of the bag 56 by means of a reinforcing grommet, the tube 57 communicating with the interior of the bag. The tube 57 is normally closed by a plug 60 which is sealed in place. The opposite end of the bag 56 may be provided with an extension 61 which is normally sealed but which may be cut off or torn off a line of perforations 62. Thus the interior of the bag is sealed before it is filled to prevent contamination of the contents.

In the use of the milk container, the end member 31 is inserted in one end of the outer sleeve, the flanges 40, 43, 35, and 36 lying in face contact with the interior surface of the walls of the sleeve. The flange 43 is in position to lie inwardly of the wall panel 12; the flanges are stitched or otherwise secured to the wall panels as indicated at 63.

Figure 3:
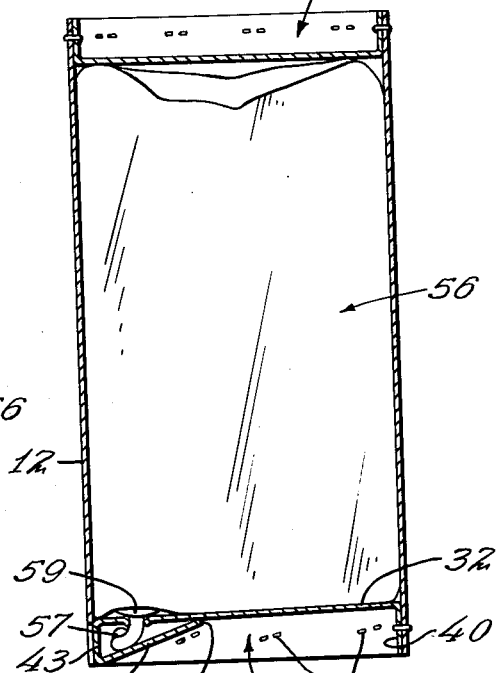
FIGURE 3 is a vertical sectional view through the sealed outer container.
Figure 4:
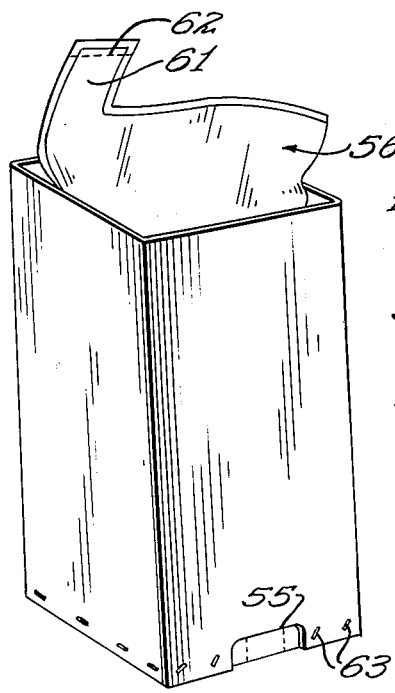
FIGURE 4 is a perspective view of the container in position for filling.
Figure 5:
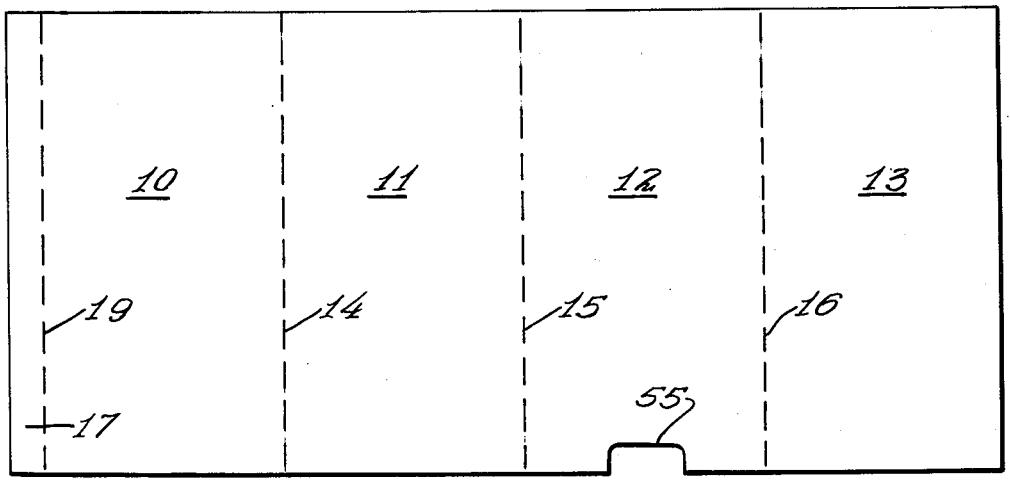
FIGURE 5 is a diagrammatic view of the blank from which the body of the container is formed.
Figure 6:
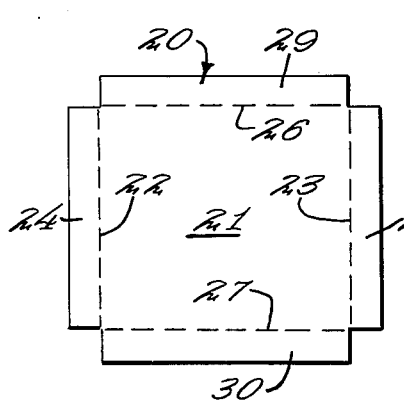
FIGURE 6 is a diagrammatic view of the blank showing the construction of one of the container ends.
Figure 7:
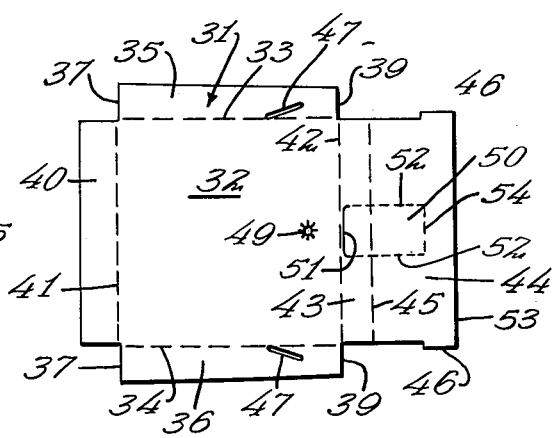
FIGURE 7 is a diagrammatic view of the blank from which the other end is formed.

The bag 56 is then inserted into the container and the tube 57 is inserted through the aperture 49. The tube 50 is then folded to overlie the surface of the panel 32 adjacent the flange 43, and the panel 44 is swung inwardly so that the end 53 of the panel engages against the panel 32. When in this position, the tongues or ears 46 engage in the locking slots 47, holding the panel 44 in position to form a compartment of generally triangular cross section. This compartment encloses the tube 56, as is indicated in FIGURE 3 of the drawings.

The bag 56 is then filled with the product. This is accomplished by cutting or ripping off the end of the extension 61, and filling the bag by a suitable filling means. The extension 61 is then clamped shut or heat sealed close so as to hermetically seal the contents within the bag.

Figure 2:
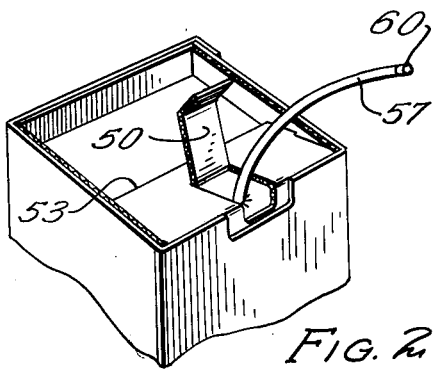
FIGURE 2 is a perspective view of an end of the container after it has been opened, and the drain tube exposed.

The filled container is delivered when it is to be used, the container is placed upon a suitable support with the end 31 lowermost. Prior to this operation, the portion of the removable tab 50 which is in the flange 43 is pressed inwardly, the flap 50 is grasped between the thumb and fingers and is pulled outwardly to expose the tube 57. The manner in which this is accomplished is clearly illustrated in FIGURE 2 of the drawings. The tube 57 is then pulled out through the opening formed by the hinging of the flap 50. Accordingly, when the container is placed on the support with the end 31 lowermost, the tube 57 is bent forwardly to extend through the notch 55.

The tube 57 is then extended through a suitable clamp which flattens the tube and acts as a tube closure when the clamp is in place. The end of the tube 57 containing the plug 60 is then cut off or the tube removed. The contents may then be drawn off in the usual manner.

In accordance with the patent statutes, we have described the principles of construction and operation of our improvement in milk containers, and while we have endeavored to set forth the best embodiment thereof, we desire to have it understood that changes may be made within the scope of the following claims without departing from the spirit of our invention.

We claim:

1. A container for liquid and the like including a rectangular sleeve, end closures for said sleeve, one said end closure including a panel extending across said sleeve, and flanges marginally connected to said panel and lying in face contact with the interior surface of said sleeve and extending to the adjoining end of said sleeve, a closure panel hinged to the edge of one of said flanges and foldable between the adjoining flanges, the end of the closure panel engaging the outer surface of said first named panel to form a compartment therebetween, a flexible bag within said sleeve and having a flexible dispensing tube attached thereto, said dispensing tube extending through said first named panel and enclosed within said compartment.

2. The structure of claim 1 and including a normally closed flap in said closure panel through which said tube may be extended.

3. The structure of claim 1 and including a normally closed flap in said closure panel and extending into said one flange, and including a notch in the portion of said sleeve lying outwardly of said flap.

4. The structure of claim 3 and in which said normally closed flap is hinged to said closure panel.

5. The structure of claim 1 and including tongues projecting from the side edges of said closure panel, and in which said adjacent flanges include slots into which said tongues engage.

6. The structure of claim 1 and in which said adjoining flanges on said panel on said one end closure are tapered to hold said panel on said end closure inclined when the edges of said adjoining flanges are coextensive with the ends of said sleeve, said dispensing tube extending through said end closure panel adjoining the lower end thereof.

References Cited in the file of this patent
UNITED STATES PATENTS

| | | |
|---|---|---|
| 2,971,686 | Muhlhoff | Feb. 14, 1961 |
| 3,007,608 | Cox | Nov. 7, 1961 |